US010209873B2

(12) United States Patent
Cho et al.

(10) Patent No.: US 10,209,873 B2
(45) Date of Patent: Feb. 19, 2019

(54) APPARATUS AND METHOD FOR DIGITAL DEVICE PROVIDING QUICK CONTROL MENU

(71) Applicant: LG ELECTRONICS INC., Seoul (KR)

(72) Inventors: Eunhyung Cho, Seoul (KR); Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 15/039,828

(22) PCT Filed: Feb. 5, 2014

(86) PCT No.: PCT/KR2014/000958
§ 371 (c)(1),
(2) Date: May 26, 2016

(87) PCT Pub. No.: WO2015/108223
PCT Pub. Date: Jul. 23, 2015

(65) Prior Publication Data
US 2016/0378319 A1    Dec. 29, 2016

(30) Foreign Application Priority Data

Jan. 14, 2014    (KR) .................. 10-2014-0004625

(51) Int. Cl.
*G06F 3/0484*    (2013.01)
*G06F 3/0487*    (2013.01)
(Continued)

(52) U.S. Cl.
CPC ........ *G06F 3/04847* (2013.01); *G06F 1/1684* (2013.01); *G06F 1/1694* (2013.01);
(Continued)

(58) Field of Classification Search
CPC combination set(s) only.
See application file for complete search history.

(56) References Cited

U.S. PATENT DOCUMENTS

| 2006/0164382 | A1* | 7/2006 | Kulas | G06F 1/1626 345/156 |
| 2010/0001967 | A1 | 1/2010 | Yoo | |
| 2010/0099394 | A1* | 4/2010 | Hainzl | G06F 1/32 455/418 |
| 2010/0123664 | A1* | 5/2010 | Shin | G06F 1/1626 345/169 |
| 2011/0080349 | A1* | 4/2011 | Holbein | G06F 1/3203 345/173 |
| 2012/0038571 | A1* | 2/2012 | Susani | G06F 3/0416 345/173 |

(Continued)

FOREIGN PATENT DOCUMENTS

KR    2003-0087525    11/2003
KR    10-2007-0066568    6/2007

OTHER PUBLICATIONS

PCT International Application No. PCT/KR2014/000958, Written Opinion of the International Searching Authority dated Oct. 15, 2014, 10 pages.

*Primary Examiner* — Doon Y Chow
*Assistant Examiner* — Wendy Nicholas
(74) *Attorney, Agent, or Firm* — Lee, Hong, Degerman, Kang & Waimey

(57) ABSTRACT

A method for controlling a digital device according to an exemplary embodiment of the present specification includes activating a display unit, when a first input is detected in a Standby mode, wherein the display unit is deactivated, activating the display unit, when a second control input is detected in the Standby mode, wherein the display unit is deactivated, and displaying a quick control menu based upon a position where the second control input is detected, detecting a third control input selecting the quick control menu, and displaying an execution screen of the application respective to the third control input, and, herein, the first control input and the second control input may each include two parts, and the first control input and the second control input may be partially identical to one another.

18 Claims, 11 Drawing Sheets

(51) Int. Cl.
  *G06F 1/16* (2006.01)
  *G06F 3/0482* (2013.01)
  *G06F 3/0488* (2013.01)
  *H04M 1/725* (2006.01)
  *G06F 3/01* (2006.01)
  *G06F 3/041* (2006.01)
  *G06F 3/0481* (2013.01)

(52) U.S. Cl.
  CPC ............ *G06F 1/3262* (2013.01); *G06F 3/016* (2013.01); *G06F 3/0416* (2013.01); *G06F 3/0482* (2013.01); *G06F 3/0487* (2013.01); *G06F 3/04817* (2013.01); *G06F 3/04883* (2013.01); *H04M 1/72583* (2013.01); *H04M 2250/12* (2013.01); *H04M 2250/22* (2013.01); *Y02D 50/20* (2018.01)

(56) References Cited

U.S. PATENT DOCUMENTS

| | | | |
|---|---|---|---|
| 2012/0157044 A1 | 6/2012 | Kim et al. | |
| 2012/0262388 A1 | 10/2012 | Huang et al. | |
| 2013/0100044 A1* | 4/2013 | Zhao | G06F 1/1694 345/173 |
| 2013/0215061 A1* | 8/2013 | Rydenhag | G06F 3/017 345/173 |
| 2014/0007008 A1* | 1/2014 | Baca | G06F 3/0482 715/810 |
| 2014/0165012 A1* | 6/2014 | Shen | G06F 3/0488 715/863 |
| 2015/0089407 A1* | 3/2015 | Suzuki | G06F 3/0482 715/763 |

\* cited by examiner

[Fig. 1]
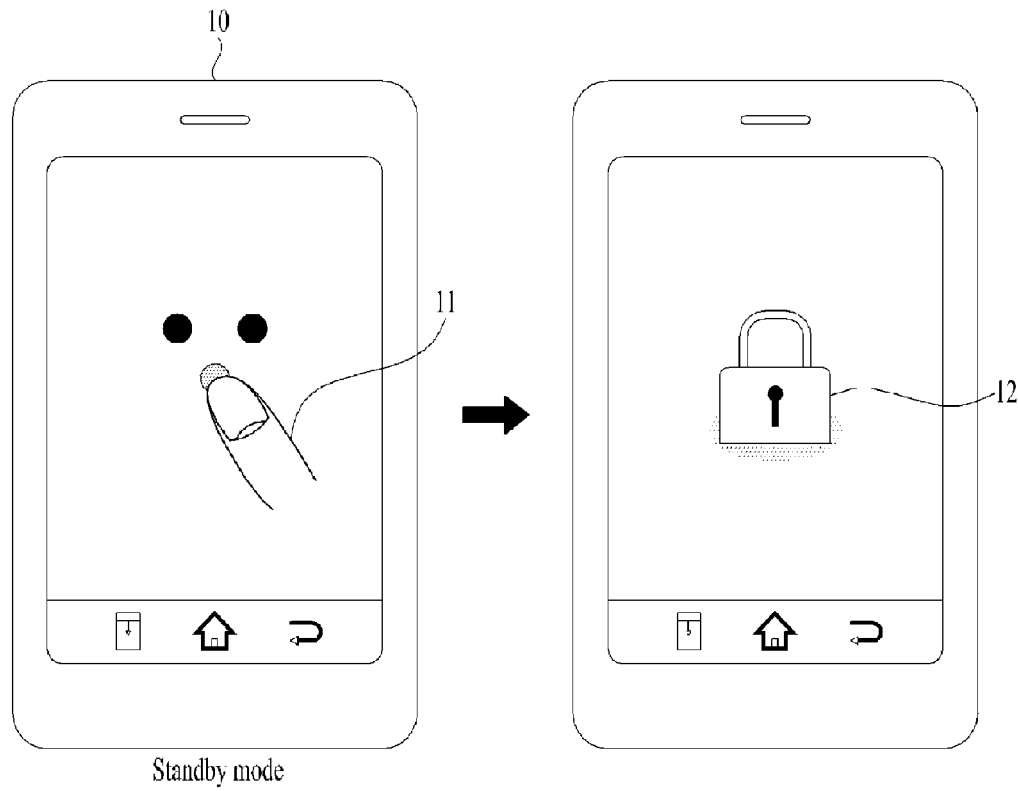
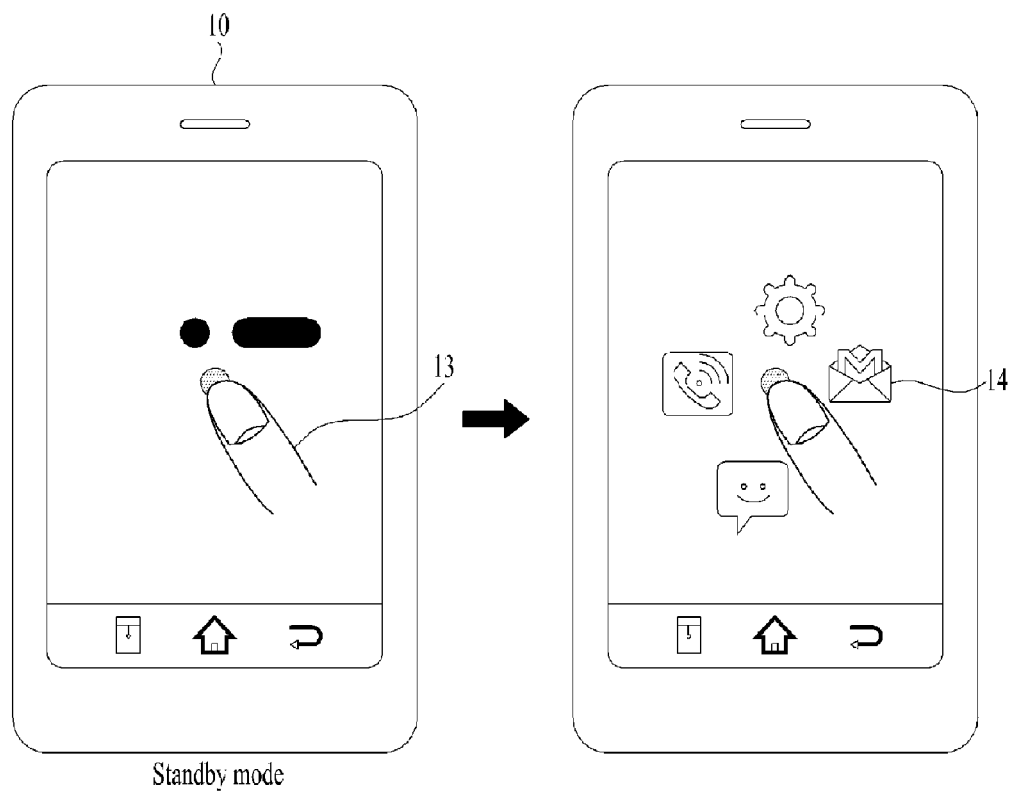

[Fig. 2]
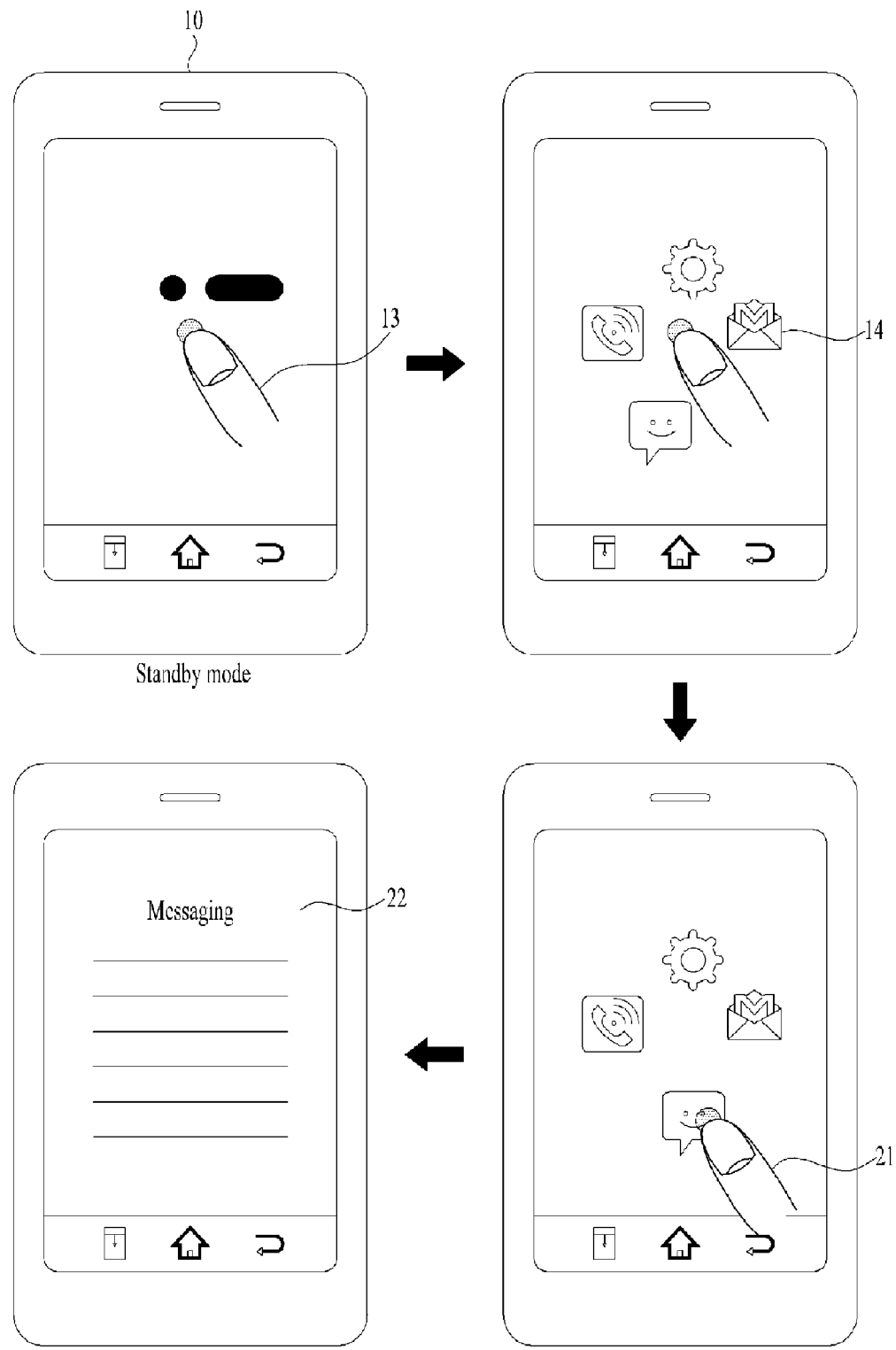

[Fig. 3]
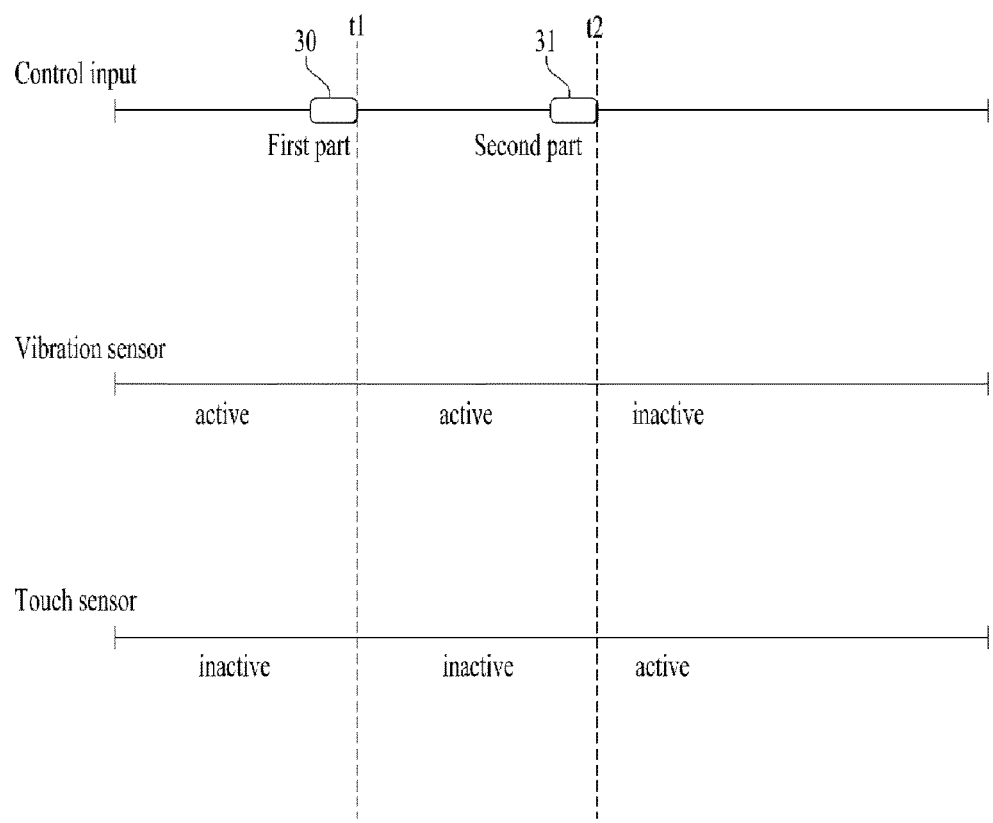

[Fig. 4]
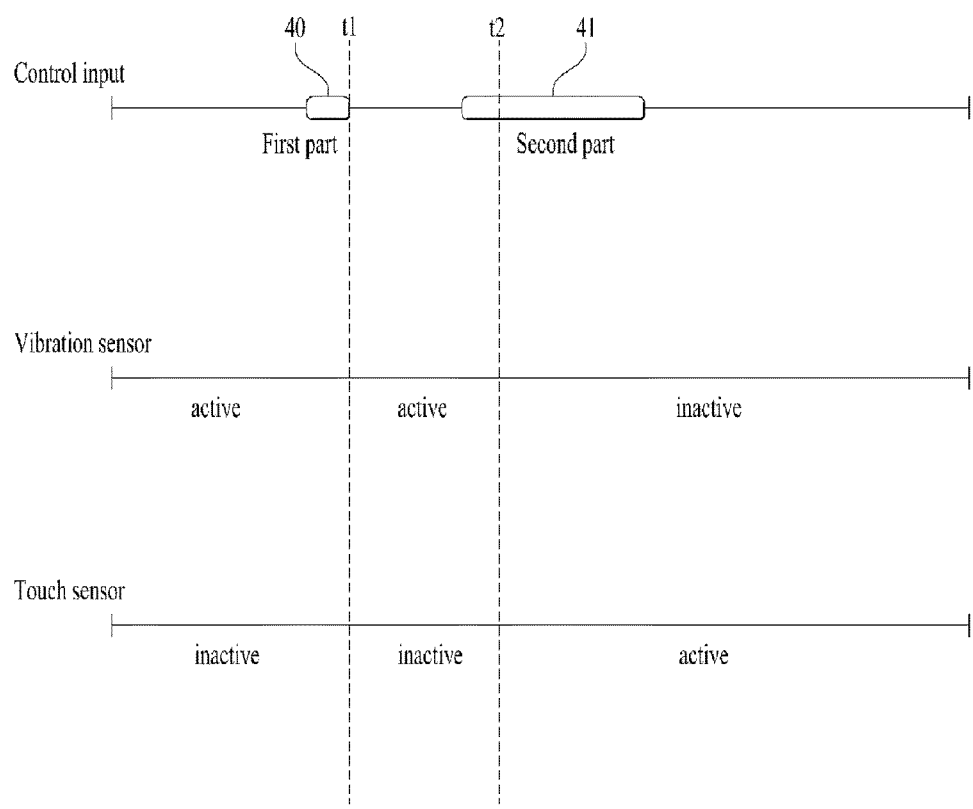

[Fig. 5]
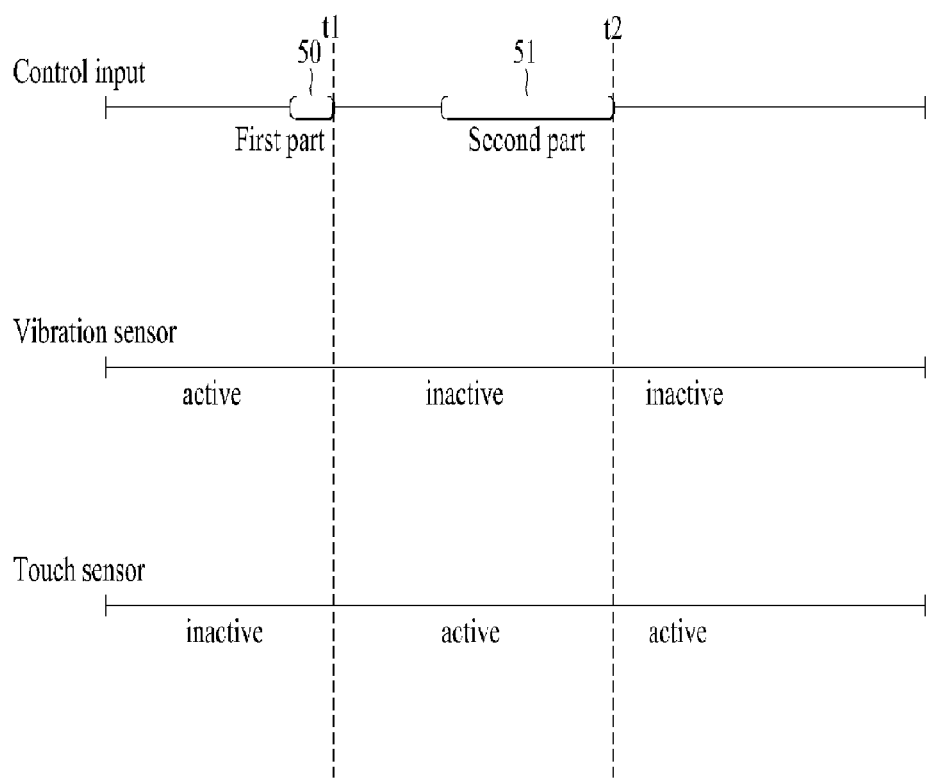

[Fig. 6]
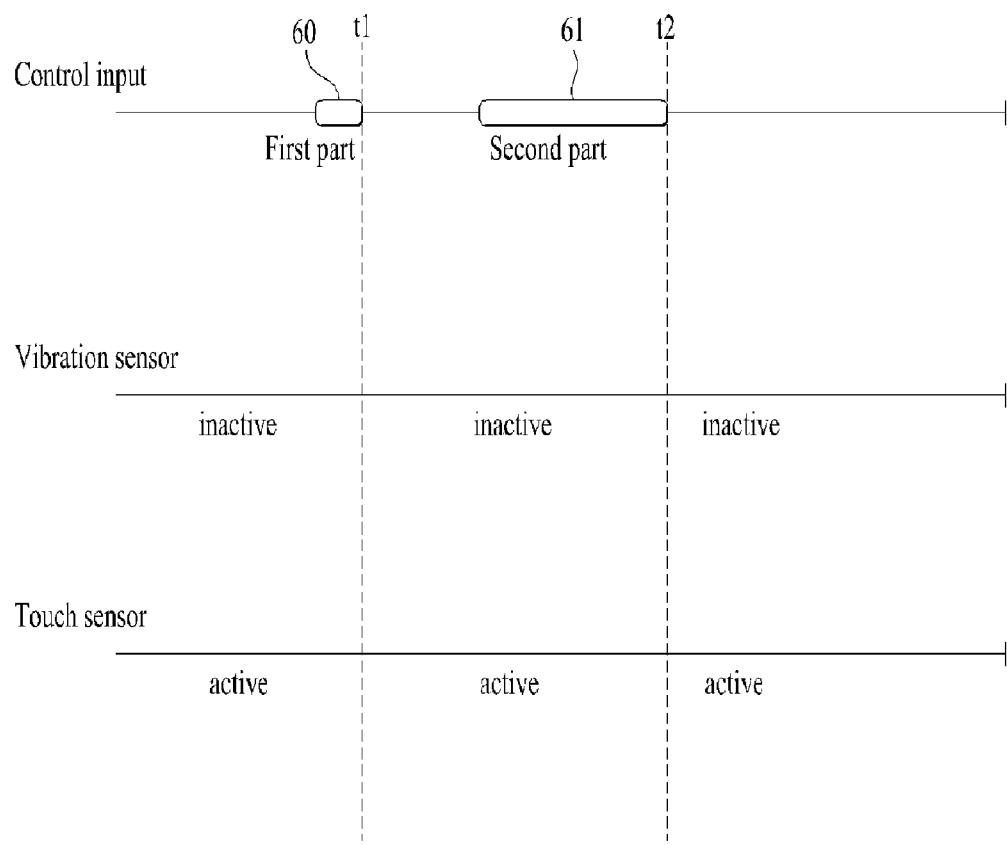

[Fig. 7]
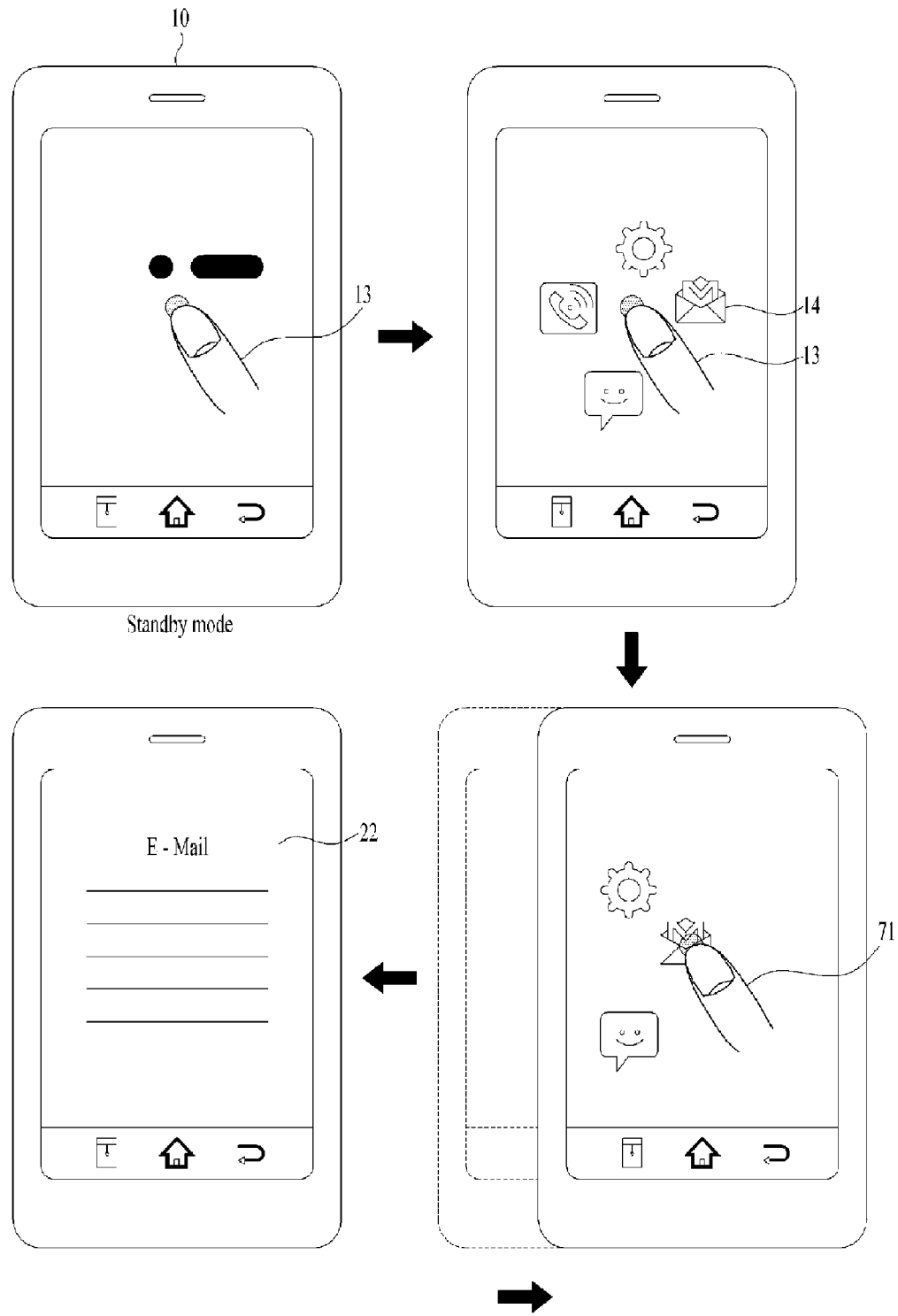

[Fig. 8]
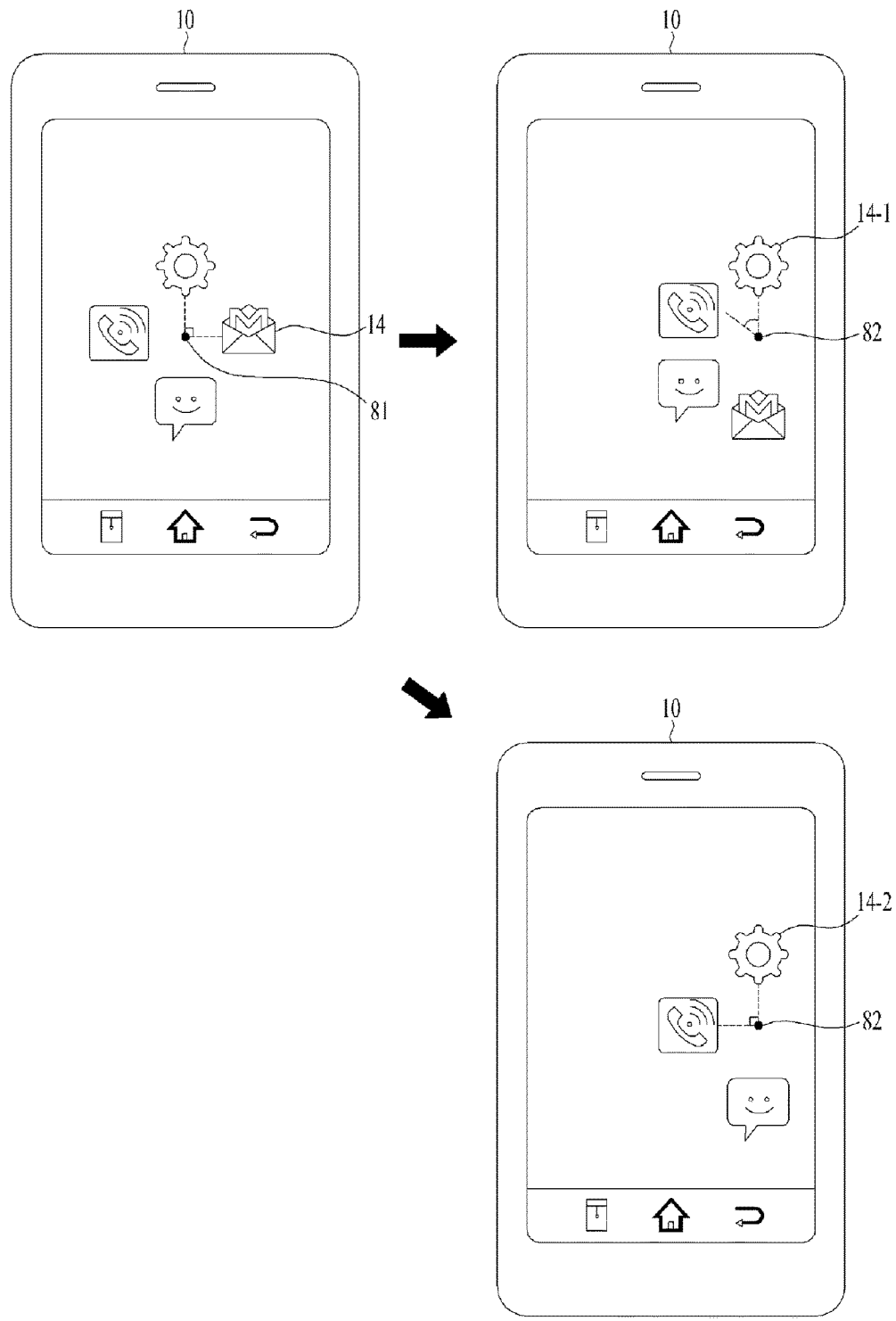

[Fig. 9]
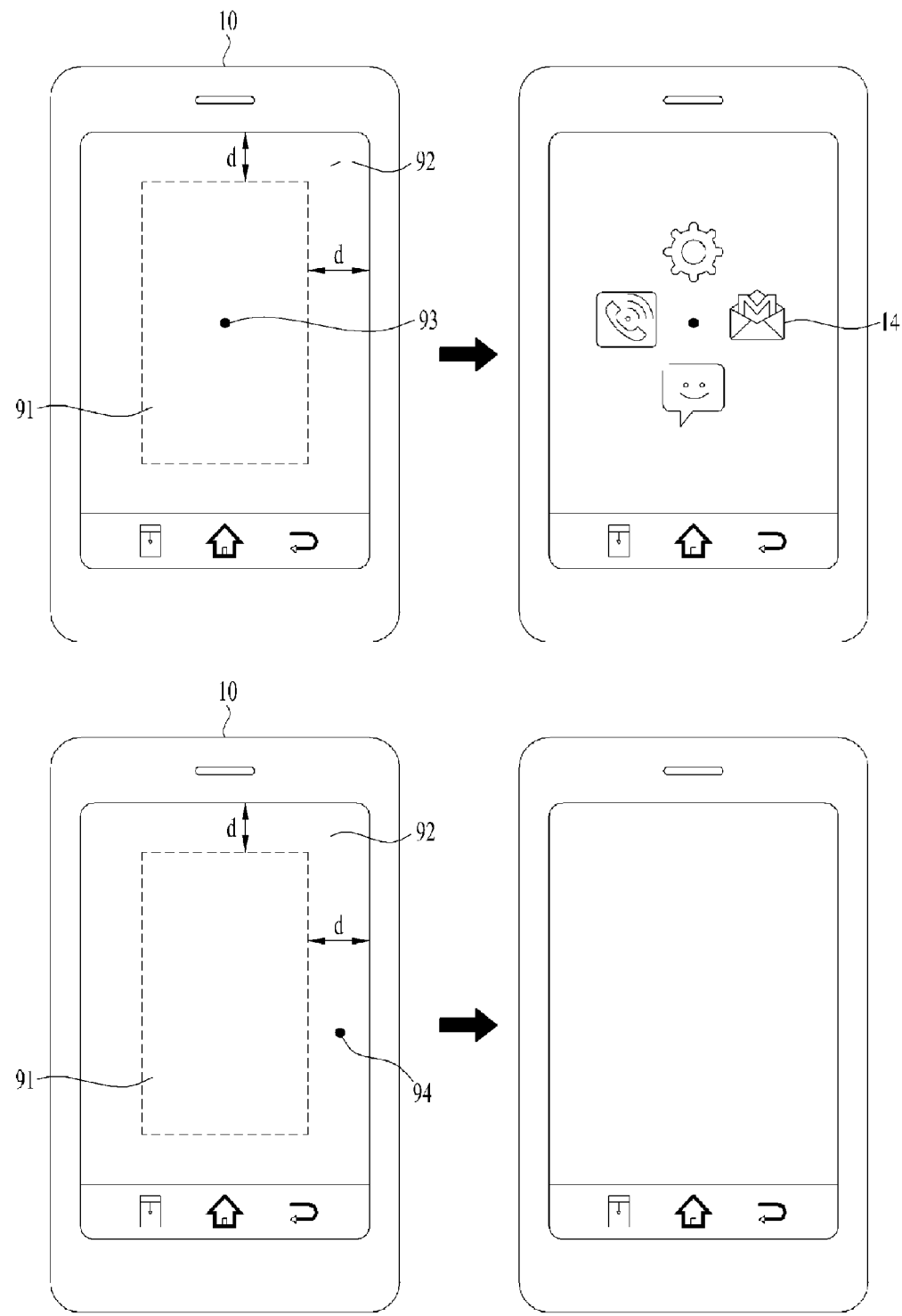

[Fig. 10]
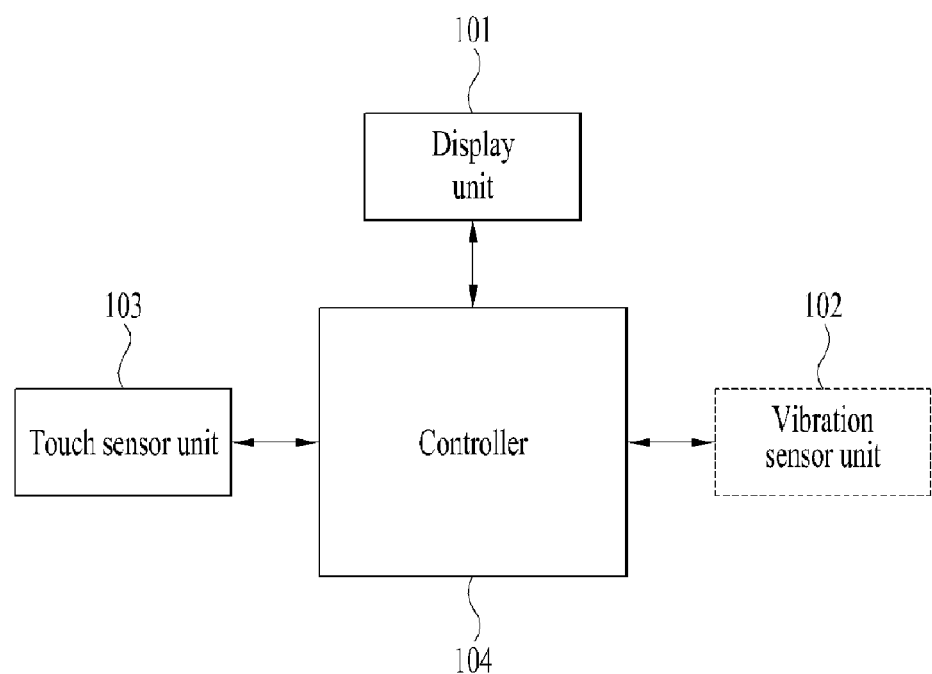

[Fig. 11]
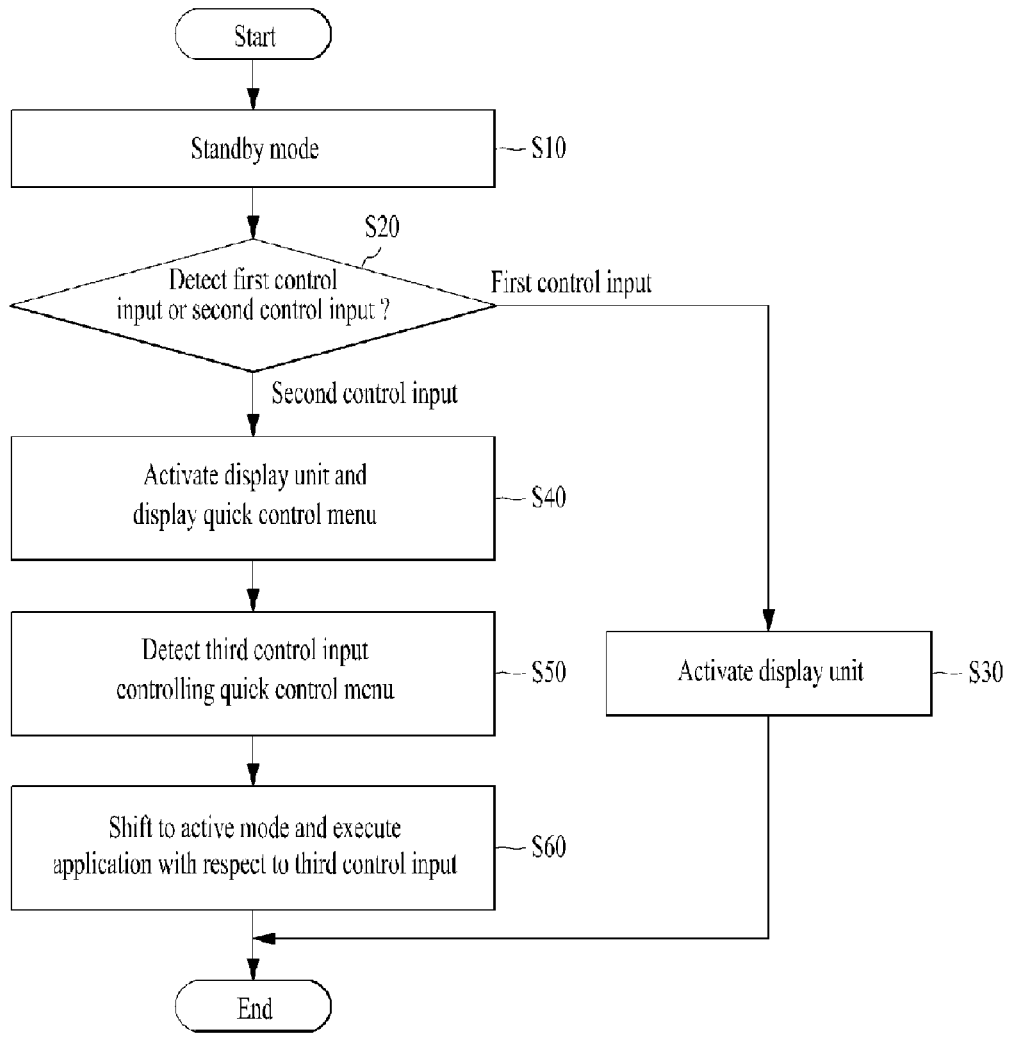

APPARATUS AND METHOD FOR DIGITAL DEVICE PROVIDING QUICK CONTROL MENU

CROSS-REFERENCE TO RELATED APPLICATIONS

This application is the National Stage filing under 35 U.S.C. 371 of International Application No. PCT/KR2014/000958, filed on Feb. 5, 2014, which claims the benefit of earlier filing date and right of priority to Korean Application No. 10-2014-0004625, filed on Jan. 14, 2014 the contents of which are all hereby incorporated by reference herein in their entirety.

TECHNICAL FIELD

This specification relates to a digital device and, more particularly, to a digital device providing a quick control menu in accordance with a user's control input.

BACKGROUND ART

With the supply of portable digital devices using batteries, digital devices have provided methods of extending battery duration time by efficiently using limited battery capacity. For example, when a user's control input is not detected for a predetermined period of time, the digital device may shift to a Standby mode and may deactivate its display unit. The user may input a control input to the digital device, which is being operated in the Standby mode, and may then shift the digital device back to the Active mode in order to execute a wanted application.

However, in order to shift the digital device from the Standby mode to the Active mode, and in order to execute the application, the user is required to perform a plurality of process steps. For example, the user is required to push a Power button of the digital device in order to activate the display unit, and, then, the user is required to release a Lock mode of the digital device and to search for an icon of the application and then to push the searched icon. Therefore, a method for providing a quick control menu that can quickly control the digital device without having to perform multiple process steps is being required.

DISCLOSURE OF INVENTION

Technical Problem

In this specification, a digital device providing a quick control menu and a method for controlling the same are provided. Most particularly, in this specification, the digital device is required to identify and detect a control input, which is being inputted in the Standby mode, and to provide a quick control menu corresponding to the detected control input.

Solution to Problem

A digital device according to an exemplary embodiment of the present specification may include a display unit configured to display an execution screen of the application and a quick control menu, a touch sensor unit configured to detect a contact between a control input and the display unit, and a controller configured to control the display unit and the touch sensor unit. The controller may be configured to activate the display unit, when a first control input is detected in a Standby mode, wherein the display unit is deactivated, to activate the display unit and display the quick control menu based upon a position where a second control input is detected, when the second control input is detected in the Standby mode, wherein the display unit is deactivated, to detect a third control input selecting the quick control menu, and to display an execution screen of the application respective to the third control input. Herein, the first control input and the second control input may each include two parts, and the first control input and the second control input may be partially identical to one another.

A method for controlling a digital device according to another exemplary embodiment of this specification may include a step of activating a display unit, when a first input is detected in a Standby mode, wherein the display unit is deactivated, a step of activating the display unit, when a second control input is detected in the Standby mode, wherein the display unit is deactivated, and displaying a quick control menu based upon a position where the second control input is detected, a step of detecting a third control input selecting the quick control menu, and a step of displaying an execution screen of the application respective to the third control input, and, herein, the first control input and the second control input may each include two parts, and the first control input and the second control input may be partially identical to one another.

Advantageous Effects of Invention

According to this specification, the digital device may detect a control input while being operated in the Standby mode.

Additionally, according to this specification, the digital device may detect a control input including two parts while being operated in the Standby mode.

Additionally, according to this specification, if a first control input is detected in the Standby mode, the digital device may activate its display unit and may display a Lock screen or a Home screen.

Additionally, according to this specification, if a second control input is detected in the Standby mode, the digital device may activate its display unit and may display a quick control menu.

Additionally, according to this specification, when the quick control menu is selected, the digital device may execute an application corresponding to the selected item.

Additionally, according to this specification, the digital device may use any one of a vibration sensor and a touch sensor in order to detect the control input.

Additionally, according to this specification, the digital device may perform detection by using a different sensor for each of the multiple parts included in the control input.

Additionally, according to this specification, the digital device may decide whether or not to display a quick control menu in accordance with a position where the control input is inputted.

Additionally, according to this specification, the digital device may realign the quick control menu in accordance with the position where the control input is inputted and may then display the realigned quick control menu.

BRIEF DESCRIPTION OF DRAWINGS

FIG. 1 illustrates a method of displaying a quick control menu with respect to a control input of a digital device according to an exemplary embodiment of the present specification.

FIG. 2 illustrates a method of the digital device for detecting a second control input and for executing an application according to the exemplary embodiment of the present specification.

FIG. 3 illustrates a method of the digital device for detecting a control input according to an exemplary embodiment of the present specification.

FIG. 4 illustrates a method of the digital device for detecting a control input according to another exemplary embodiment of the present specification.

FIG. 5 illustrates a method of the digital device for detecting a control input according to another exemplary embodiment of the present specification.

FIG. 6 illustrates a method of the digital device for detecting a control input according to another exemplary embodiment of the present specification.

FIG. 7 illustrates a method of the digital device for selecting a shortcut icon of a quick control menu according to the exemplary embodiment of the present specification.

FIG. 8 illustrates a method of the digital device for realigning the quick control menu according to the exemplary embodiment of the present specification.

FIG. 9 illustrates a method of the digital device for deciding whether or not to display the quick control menu according to the exemplary embodiment of the present specification.

FIG. 10 illustrates a block view of a digital device according to an exemplary embodiment of the present specification.

FIG. 11 illustrates an operation flow chart of the digital device according to an exemplary embodiment of the present specification.

BEST MODE FOR CARRYING OUT THE INVENTION

Hereinafter, the exemplary embodiments will be described in detail with reference to the accompanying drawings and the content indicated in the accompanying drawings. However, the scope of the present invention will not be limited to or limited by the exemplary embodiments presented herein.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

In this specification, the digital device may correspond to a device including a display unit. For example, the digital device may include a smart phone, a smart pad, a smart watch, a notebook, laptop computer, a tablet computer, a music player, a smart table, a monitor, a remote controller, or a television.

FIG. 1 illustrates a method of displaying a quick control menu with respect to a control input of a digital device according to an exemplary embodiment of the present specification. The digital device (10) may detect a control input while being operated in a Standby mode, wherein a display unit is deactivated. The digital device (10) may detect the control input by using at least one of a touch sensor and a vibration sensor. More specifically, the digital device (10) may maintain the vibration sensor or the touch sensor in an Active mode even while the digital device (10) is being operated in the Standby mode, and the digital device (10) may detect the control input by using the activated vibration sensor or touch sensor. The digital device (10) may be capable of differentiating different control inputs from one another and may perform different operations with respect to each control input.

In an upper portion of FIG. 1, the digital device (10), which is in the Standby mode, may detect a first control input (11). In this specification, a Standby mode refers to an operation mode, wherein a display unit is in an inactive state. According to an exemplary embodiment of this specification, in the Standby mode, the digital device (10) may detect an input of briefly touching the digital device two times as the first control input (11). More specifically, when two short touches are detected, the digital device (10) may detect the two short touches as the first control input (11). However, the first control input (11), which includes two short touches, is merely an exemplary embodiment, and, therefore, the digital device (10) of this specification will not be limited only to this exemplary embodiment.

The first control input (11) may include two parts. As described above, the first control input (11) may include a first short touch as a first part of the first control input (11) and a second short touch as a second part of the first control input (11).

When the first control input (11) is detected, the digital device (10) may activate its display unit. Depending upon its settings, the digital device (10) having its display device activated may display a lock screen (12) or may display a home screen. Herein, the lock screen may correspond to a screen requesting for additional control input before displaying the home screen in order to prevent the digital device from malfunctioning. Additionally, the home screen corresponds to a screen displaying icons respective to each application, and the user may execute an application by selecting the respective displayed icon.

In a lower portion of FIG. 1, the digital device (10), which is in the Standby mode, may detect a second control input. According to the exemplary embodiment of this specification, in the Standby mode, the digital device (10) may detect a motion of briefly touching the digital device one time and touching the digital device at length one time as the second control input (13). More specifically, when a short touch and a long touch are sequentially detected, the digital device (10) may detect such detected touches as the second control input (13). However, the second control input (13), which includes one short touch and one long touch, is merely an exemplary embodiment, and, therefore, the digital device (10) of this specification will not be limited only to this exemplary embodiment.

The second control input (13) may include two parts. As described above, the second control input (13) may include a short touch as a first part of the second control input (13) and a long touch as a second part of the second control input (13).

When the second control input (13) is detected, the digital device (10) may activate the display unit and may display a quick control menu (14). The digital device (10) may display an icon executing an application as the quick control menu (14). Additionally, when one of many shortcut icons, which are included in the quick control menu (14), is selected, the digital device (10) may immediately execute an application respective to the selected shortcut icon without having to perform any additional procedure, such as lock release or unlock, and so on. According to the exemplary embodiment, the digital device (10) may selectively include a shortcut icon of an application, which can be executed without having to release the lock mode of the digital device, in the quick control menu (14).

As described above, while being operated in the Standby mode, the digital device (10) may perform different operations respective to each of the detected first control input (11) and the second control input (13). Additionally, each of the first control input (11) and the second control input (13) may include two parts. In this specification, the first control input and the second control input may be partially identical to one another. For example, when the first control input includes a first part and a second part, and when the second control unit includes a third part and a fourth part, the first part and the third part may be identical to one another. More specifically, the digital device (10) may differentiate the first control input from the second control input by comparing the second part of the first control input with the fourth part of the second control input.

Accordingly, by using the partially identical control inputs, the user may activate the display unit or may display a quick control menu, and, by doing so, the user may quickly control the digital device (10).

FIG. 2 illustrates a method of the digital device for detecting a second control input and for executing an application according to the exemplary embodiment of the present specification. As shown in an upper left part of FIG. 2, in the Standby mode, the digital device (10) may detect a second control input (13), which includes a first part and a second part. As shown in an upper right part of FIG. 2, the display device (10) may activate the display unit with respect to the second control input (13) and may display a quick control menu (14). The digital device (10) may display a shortcut icon, which corresponds to an application that can be immediately executed without performing any lock releasing or unlocking operation, as the quick control menu (14).

The digital device (10) may detect a third control input (21), which selects a shortcut icon being included in the displayed quick control menu. When the third control input (21) is detected, the digital device may be shifted to an Active mode. The third control input (21) may be inputted while a contact between the second control input and the display unit is maintained. More specifically, the digital device (10) may detect a slide input selecting a shortcut icon, which is included in the quick control menu (14), in a position where the second control input is inputted as the third control input (21). When a shortcut icon of a Messaging application is selected by the third control input (21), as shown in a lower right part of FIG. 2, the digital device (10) may display an execution screen (22) of the Messaging application, as shown in a lower left part of FIG. 2.

As described above, in the Standby mode, the digital device (10) may detect the second control input and its successive third control input, thereby being capable of immediately executing the application, which is selected by the user. Accordingly, without having to undergo multiple process steps, the user may easily execute a wanted application by controlling the digital device, which is being operated in the Standby mode.

FIG. 3 illustrates a method of the digital device for detecting a control input according to an exemplary embodiment of the present specification. The digital device (10) may detect a control input by using multiple sensor units. For example, the digital device (10) may detect a control input by using a vibration sensor unit and a touch sensor unit. In this specification, the control input may include two parts, and a method for detecting the two parts, which are included in the control input, will hereinafter be described.

The digital device (10) may detect a control input including a first part (30) and a second part (31). In FIG. 3, the control input may include a first part (30), which corresponds to a short touch, and a second part (31), which corresponds to a short touch. Herein, after the first part (30) is ended, the digital device (10) may detect an input occurring within a second time period as the second part (31).

In the Standby mode, the digital device (10) may activate the vibration sensor unit and may deactivate the touch sensor unit. In the Standby mode, by deactivating the touch sensor unit, the digital device (10) may gain a power saving effect.

In the Standby mode, the digital device (10) may detect the first part (30) of the control input by using the vibration sensor unit. The digital device (10) may detect the first part by sensing a vibration that is generated by the first part (30), which corresponds to a short touch. The digital device (10) may maintain the vibration sensor unit in an active state at t1, where the first part (30) is detected, and may maintain the touch sensor unit in an inactive state.

After detecting the first part of the control input, the digital device (10) may detect a second part (31) of the control input by using the vibration sensor unit. The digital device (10) may detect the second part (31) by sensing a vibration that is generated by the second part (31), which corresponds to a short touch. The digital device (10) may shift the vibration sensor unit to an inactive state at t2, where the second part (31) is detected, and may shift the touch sensor unit to an active state. More specifically, by activating only the vibration sensor unit up until the point before the first part (30) and the second part (31) of the control input are detected, and by deactivating the touch sensor unit, the digital device (10) may reduce power consumption.

After the first part (30) and the second part (31) of the control input are detected, the digital device (10) may activate the touch sensor unit and may, then, detect additional control input of the user. Herein, the additional control input may correspond to a touch input. After detecting the second part (31) of the control input, by activating only the touch sensor unit and by deactivating the vibration sensor unit, the digital device (10) may reduce power consumption.

FIG. 4 illustrates a method of the digital device for detecting a control input according to another exemplary embodiment of the present specification. The digital device (10) may detect a control input by using multiple sensor units. For example, the digital device (10) may detect a control input by using a vibration sensor unit and a touch sensor unit. In this specification, the control input may include two parts, and a method for detecting the two parts, which are included in the control input, will hereinafter be described.

The digital device (10) may detect a control input including a first part (40) and a second part (41). In FIG. 4, the control input may include a first part (40), which corresponds to a short touch, and a second part (41), which corresponds to a long touch. Herein, after the first part (30) is ended, the digital device (10) may detect an input occurring within a second time period as the second part (31). In the Standby mode, the digital device (10) may activate the vibration sensor unit and may deactivate the touch sensor unit. In the Standby mode, by deactivating the touch sensor unit, the digital device (10) may gain a power saving effect.

In the Standby mode, the digital device (10) may detect the first part (40) of the control input by using the vibration sensor unit. The digital device (10) may detect the first part by sensing a vibration that is generated by the first part (40), which corresponds to a short touch. The digital device (10) may maintain the vibration sensor unit in an active state at t1, where the first part (40) is detected, and may maintain the touch sensor unit in an inactive state.

After detecting the first part (40) of the control input, the digital device (10) may detect a second part (41) of the control input by using the vibration sensor unit. The digital device (10) may detect a starting point of the second part (41) by sensing a vibration that is generated by the second part (41), which corresponds to a long touch. The digital device (10) may shift the vibration sensor unit to an inactive state at t2, where the starting point of the second part (41) is detected, and may shift the touch sensor unit to an active state. More specifically, by activating only the vibration sensor unit up until the point before the first part (40) and the starting point of the second part (41) of the control input are detected, and by deactivating the touch sensor unit, the digital device (10) may reduce power consumption.

When the starting point of the second part (41) is detected, the digital device (10) may activate the touch sensor unit. The digital device (10) may decide that the second part (41), which corresponds to the long touch, has been detected only when a contact between the second part (41) and the display unit is maintained for a first time period or longer. More specifically, the digital device (10) may sequentially use the vibration sensor unit and the touch sensor unit in order to detect the second part (41) of the control input. After the first part (40) and the starting point of the second part (41) have been detected, by activating only the touch sensor unit and by deactivating the vibration sensor unit, the digital device (10) may reduce power consumption.

After the first part (40) and the second part (41) of the control input are detected, the digital device (10) may display a quick control menu and may detect an additional control input of the user through the touch sensor unit. Herein, the additional control input may correspond to a touch input. For example, the digital device (10) may detect a third control input selecting the quick control menu, which is described above with reference to FIG. 2, through the touch sensor unit.

FIG. 5 illustrates a method of the digital device for detecting a control input according to another exemplary embodiment of the present specification. The digital device (10) may detect a control input by using multiple sensor units. For example, the digital device (10) may detect a control input by using a vibration sensor unit and a touch sensor unit. In this specification, the control input may include two parts, and a method for detecting the two parts, which are included in the control input, will hereinafter be described.

The digital device (10) may detect a control input including a first part (50) and a second part (51). In FIG. 5, the control input may include a first part (50), which corresponds to a short touch, and a second part (51), which corresponds to a long touch. Herein, after the first part (30) is ended, the digital device (10) may detect an input occurring within a second time period as the second part (31). In the Standby mode, the digital device (10) may activate the vibration sensor unit and may deactivate the touch sensor unit. In the Standby mode, by deactivating the touch sensor unit, the digital device (10) may gain a power saving effect.

In the Standby mode, the digital device (10) may detect the first part (50) of the control input by using the vibration sensor unit. The digital device (10) may detect the first part by sensing a vibration that is generated by the first part (50), which corresponds to a short touch. The digital device (10) may shift the vibration sensor unit to an inactive state at t1, where the first part (50) is detected, and may shift the touch sensor unit to an active state. More specifically, by activating only the vibration sensor unit up until the point before the first part (50) of the control input is detected, and by deactivating the touch sensor unit, the digital device (10) may reduce power consumption.

After the first part (50) of the control input is detected, the digital device (10) may detect the second part (51) of the control input by using the touch sensor unit. The digital device (10) may sense a touch generated by the second part (51), which corresponds to a long touch, and may then detect a starting point and an ending point of the second part. The digital device (10) may respectively detect a point where a contact between the second part (51) and the display unit begins and a point where a contact between the second part (51) and the display unit is released as the starting point and the ending point of the second part. The digital device (10) may decide that the second part (41), which corresponds to the long touch, has been detected only when a contact between the second part (41) and the display unit is maintained for a first time period or longer.

The digital device (10) may maintain the vibration sensor unit in an inactive state at t2, where the ending point of the second part (51) is detected, and may maintain the touch sensor unit in an active state. More specifically, after the first part (50) of the control input is detected, by activating only the touch sensor unit and by deactivating the vibration sensor unit, the digital device (10) may reduce power consumption.

More specifically, by sequentially using the vibration sensor unit and the touch sensor unit, the digital device (10) may detect the first part (50) and the second part (51) of the control input.

After the first part (50) and the second part (51) of the control input are detected, the digital device (10) may display a quick control menu and may detect an additional control input of the user through the touch sensor unit. Herein, the additional control input may correspond to a touch input. For example, the digital device (10) may detect a third control input selecting the quick control menu, which is described above with reference to FIG. 2, through the touch sensor unit.

FIG. 6 illustrates a method of the digital device for detecting a control input according to another exemplary embodiment of the present specification. The digital device (10) may detect a control input by using multiple sensor units. In this specification, the control input may include two parts, and a method for detecting the two parts, which are included in the control input, will hereinafter be described.

The digital device (10) may detect a control input including a first part (60) and a second part (61). In FIG. 6, the control input may include a first part (60), which corresponds to a short touch, and a second part (61), which corresponds to a long touch. Herein, after the first part (30) is ended, the digital device (10) may detect an input occurring within a second time period as the second part (31). In the Standby mode, the digital device (10) may activate the touch sensor unit and may deactivate the vibration sensor unit. In the Standby mode, by deactivating the vibration sensor unit, the digital device (10) may gain a power saving effect.

In the Standby mode, the digital device (10) may detect the first part (60) of the control input by using the touch sensor unit. The digital device (10) may detect the first part by sensing a touch that is generated by the first part (60), which corresponds to a short touch. The digital device (10)

may maintain the vibration sensor unit in an inactive state at t1, where the first part (60) is detected, and may maintain the touch sensor unit in an active state.

After the first part (60) of the control input is detected, the digital device (10) may detect the second part (61) of the control input by using the touch sensor unit. The digital device (10) may sense a touch generated by the second part (61), which corresponds to a long touch, and may then detect a starting point and an ending point of the second part. The digital device (10) may respectively detect a point where a contact between the second part (61) and the display unit begins and a point where a contact between the second part (61) and the display unit is released as the starting point and the ending point of the second part. The digital device (10) may decide that the second part (61), which corresponds to the long touch, has been detected only when a contact between the second part (61) and the display unit is maintained for a first time period or longer.

The digital device (10) may maintain the vibration sensor unit in an inactive state at t2, where the ending point of the second part (61) is detected, and may maintain the touch sensor unit in an active state. More specifically, in detecting a control input including the first part (60) and the second part (61), by activating only the touch sensor unit and by deactivating the vibration sensor unit, the digital device (10) may reduce power consumption.

More specifically, by using only the touch sensor unit, the digital device (10) may detect the first part (60) and the second part (61) of the control input.

After the first part (60) and the second part (61) of the control input are detected, the digital device (10) may display a quick control menu and may detect an additional control input of the user through the touch sensor unit. Herein, the additional control input may correspond to a touch input. For example, the digital device (10) may detect a third control input selecting the quick control menu, which is described above with reference to FIG. 2, through the touch sensor unit.

FIG. 7 illustrates a method of the digital device for selecting a shortcut icon of a quick control menu according to the exemplary embodiment of the present specification. After the quick control menu is displayed by a second control input, the digital device (10) may detect a movement of the digital device (10). After the quick control menu is displayed, in case the digital device is moved along a first direction, the digital device (10) may move or relocate a displayed position of the quick control menu along an opposite direction of the first direction and may then display the repositioned quick control menu. The quick control menu may include a plurality of shortcut icons respective to each of the plurality of applications. The digital device may select a shortcut icon, which is located along a direction opposite to the first direction from a position where the second control input is detected, and the digital device may display an execution screen of the application respective to the selected shortcut icon. Accordingly, the user may be capable of easily selecting an item of the quick control menu.

In an upper left part of FIG. 7, the digital device (10) being operated in the Standby mode may detect a second control input (13). As shown in an upper right part of FIG. 7, the digital device (10) may display a quick control menu (14) respective to the second control input (13). The user may input a third control input (71), which selects a shortcut icon included in the displayed quick control menu (14). The third control input (21) described in FIG. 2 corresponds to a slide input successive to the second control input (13).

However, the third control input (71) of FIG. 7 may correspond to an input that relocates the position of the digital device. More specifically, as shown in a lower right part of FIG. 7, the digital device (10) may be relocated along a rightward direction by the third control input (71). As a result, a position where the third control input (71) is detected within the display unit of the digital device (10) may not be changed.

Although the contact position of the third control input (71) is not changed, the digital device (10) may relocate or change the position of the quick control menu (14). The digital device (10) may relocate the quick control menu (14) along a direction opposite to the direction along which the digital device (10) is relocated by the third control input (71). As shown in the lower right part of FIG. 7, since the digital device (10) is moved along a rightward direction, the digital device may relocate or move the displayed position of the quick control menu long a leftward direction. Moreover, the digital device (10) may position at least one shortcut icon included in the quick control menu to a position where the contact between the third control input (71) and the display unit is detected.

As a result, the user may select an item by using a method of moving or relocating the digital device (10) without having to input a slide input in order to select an item, which is included in the quick control menu. In the lower right part of FIG. 7, the user may move the digital device (10) rightward, and, by doing so, the user may select a shortcut icon included on a right side of the quick control menu. In other words, when the user had intended to input a slide input by using his or her finger, yet when the user's finger failed to slide over the display unit, and when the digital device (10) moved instead, this may still allow the user to select a wanted shortcut icon.

The digital device (10) may execute the application respective to the shortcut icon, which is selected by the third control input (71), and may display an execution screen of the corresponding application.

FIG. 8 illustrates a method of the digital device for realigning the quick control menu according to the exemplary embodiment of the present specification. The digital device (10) may decide a position, in which the quick control menu is to be displayed, with respect to a position, in which the control input is detected. If some of the shortcut icons included in the quick control menu cannot be displayed due to a limited surface of the display area, the digital device (10) may realign the quick control menu and display the realigned quick control menu.

As shown in the left part of FIG. 8, when the control input (81) is detected at a central portion of the display unit, the digital device (10) may display all shortcut icons included in the quick control menu (14). The digital device (10) may display the shortcut icons in accordance with a predetermined alignment. For example, the digital device (10) may align the shortcut icons, so that an angle between each of the shortcut icons included in the quick control menu (14) can form an angle of 90 degrees or a right angle.

Alternatively, as shown in an upper right part of FIG. 8, when the control input (82) is detected at an edge portion or boundary area of the display unit, the digital device (10) may realign the shortcut icons included in the quick control menu (14). For example, the digital device (10) may display a modified quick control menu (14-1), wherein an angle between each shortcut icon is reduced to 45 degrees. Accordingly, the digital device (14) may realign the shortcut icons and may display all shortcut icons included in the modified quick control menu (14-1).

According to another exemplary embodiment, as shown in a lower right part of FIG. 8, when the control input (82) is detected at an edge portion or boundary area of the display unit, the digital device (10) may partially display the shortcut icons included in the quick control menu (14). For example, the digital device (10) may maintain the angle between each shortcut icon included in the quick control menu (14) at an angle of 90 degrees. As a result, the digital device (10) may display a quick control menu (14-2) excluding some of the shortcut icons initially included in the quick control menu. Herein, the shortcut icons that are to be excluded may be decided based upon a position, in which the control input (82) is detected. As shown in the lower right part of FIG. 8, when the control input (82) is detected at a right-side edge portion or boundary area of the display unit, among the shortcut icons included in the quick control menu (14), the digital device (10) may exclude shortcut icons that are located on the right side. Alternatively, when the control input (82) is detected at a lower portion of the display unit, among the shortcut icons included in the quick control menu (14), the digital device (10) may exclude shortcut icons located at the lower portion and may display the processed quick control menu.

Accordingly, even when all of the shortcut icons included in the quick control menu cannot be displayed, the digital device (10) may display a realigned quick control menu, so as to provide the realigned quick control menu to the user.

FIG. 9 illustrates a method of the digital device for deciding whether or not to display the quick control menu according to the exemplary embodiment of the present specification. The digital device (10) may display a quick control menu only when a control input is detected from a predetermined area within the display unit. When the control input is detected from an area outside of the predetermined area, the digital device (10) may bypass the detected control input or may not display the quick control menu.

In FIG. 9, the digital device (10) may divide the display unit into a first area and a second area. The digital device (10) may determine or set up a central area, which is located at a distance exceeding a first distance from an edge of the display unit, as a first area (91). Herein, the first distance may be expressed as distance d in FIG. 9. Additionally, the digital device (10) may determine a borderline area, which is located within the first distance from the edge of the display unit, as a second area (92).

In an upper part of FIG. 9, the digital device (10) may detect a control input (93) in the first area (91). In case the control input is detected in the first area (91), the digital device may display the quick control menu (14). If the control input includes two parts, and in case a second part of the control input is detected in the first area (91), the digital device may display the quick control menu.

In a lower part of FIG. 9, the digital device (10) may detect a control input (94) in the second area (92). If the control input is detected in the second area (92), the digital device (10) may bypass the detected control input without displaying the quick control menu (14). If the control input includes two parts, and in case a second part of the control input is detected in the second area, the digital device may bypass the control input without displaying the quick control menu.

More specifically, the digital device (10) may identify different areas of the display unit, and the digital device (10) may determine a first area (91), wherein the quick control menu is displayed with respect to the control input, and a second area (92), wherein the quick control menu is not displayed. Herein, a first distance, which corresponds to a distance differentiating the first area from the second area, may be determined by the manufacturer during the fabrication process of the digital device or may be determined by the user.

FIG. 10 illustrates a block view of a digital device according to an exemplary embodiment of the present specification. The digital device may include a display unit (101), a vibration sensor unit (102), a touch sensor unit (103), and a controller (104). Herein, the vibration sensor unit (102) may correspond to an optional component.

The display unit (101) may display visual information. In this specification, the display unit (101) may display a lock screen or a quick control menu in accordance with the type of a control input, which is detected while the digital device is being operated on the Standby mode. Additionally, the display unit (101) may display an execution screen of an application corresponding to a shortcut icon, which is selected from the quick control menu.

According to the exemplary embodiment, the display unit (101) may include at least one of a Light-Emitting Diode (LED), an Organic Light-Emitting Diode (OLED), a Liquid Crystal Display (LCD), an electronic ink, and a flexible display. The display unit may include a touch sensitive display unit, and the display unit may detect a control input, which touches the display unit.

The vibration sensor unit (102) may correspond to an optional component of the digital device. The vibration sensor unit (102) may sense a vibration generated from a control input of the user. The vibration generated from the control input may include vibration of the digital device, which is generated from the control input. As described above with reference to FIG. 3 to FIG. 6, the vibration sensor unit (102) may be used along with the touch sensor unit in order to detect a first control input and a second control input. Additionally, depending upon whether or not at least one of the first control input and the second control input has been detected, the vibration sensor unit (102) may be activated or deactivated. Furthermore, when the touch sensor unit is in an active state, the vibration sensor unit (102) may be shifted to an inactive state, and, when the touch sensor unit is in an inactive state, the vibration sensor unit (102) may be shifted to an active state. More specifically, the digital device of this specification may complementarily shift the power of the touch sensor unit and the vibration sensor unit.

The touch sensor unit (103) may sense a contact between a control input of the user and the display unit. The touch sensor unit (103) may sense a control input touching the display unit. The touch sensor unit (103) may sense the control input of the user by using a pressure-sensitive or static-sensitive touch sensor. Additionally, the touch sensor unit (103) may deliver information on the sensed control input to the controller (104). According to the exemplary embodiments, the above-described display unit (101) and the touch sensor unit (103) may be integrated and designed as a touch-sensitive display unit. As described above with reference to FIG. 3 to FIG. 6, the vibration sensor unit (102) may be used along with the touch sensor unit in order to detect a first control input and a second control input. Additionally, depending upon whether or not at least one of the first control input and the second control input has been detected, the touch sensor unit (103) may be activated or deactivated. Furthermore, when the vibration sensor unit (102) is in an active state, the touch sensor unit (103) may be shifted to an inactive state, and, when the vibration sensor unit is in an inactive state, the touch sensor unit may be shifted to an active state. More specifically, the digital device of this specification may complementarily shift the power of the touch sensor unit and the vibration sensor unit.

In addition to the above-described sensor units, the digital device may further include an acceleration sensor unit. The digital device may use the acceleration sensor unit in order to detect that the digital device has moved. By using the acceleration sensor unit, the digital device may be capable of sensing how much and along which direction the digital device has moved by the control input, and the respective information may be delivered to the controller.

The controller (104) may control the display unit (101) by using the information, which is delivered from at least one of the touch sensor unit, the vibration sensor unit, and the acceleration sensor unit. Even when the digital device is being operated in the Standby mode, the controller may maintain the touch sensor unit or the vibration sensor unit in the active state. The controller (104) may detect the control input and may display a lock screen or a lock quick control menu on the display unit. In case the first control input is detected in the Standby mode, the controller (104) may display a lock screen on the display unit. In case the second control input is detected in the Standby mode, the controller (104) may display a quick control menu on the display unit.

By detecting the control input, the controller (104) may collectively use the vibration sensor unit and the touch sensor unit.

According to an exemplary embodiment of this specification, as described in FIG. 3, the controller (104) may detect the first part and the second part of the second control input by using the vibration sensor unit, and the controller (104) may detect a third control input, which is detected after the corresponding control input has been detected, by using the touch sensor. For example, in case the controller detects the second control input, which displays the quick control menu, by using the vibration sensor unit, the controller may detect the third control input, which selects a shortcut icon included in the quick control menu, by using the touch sensor unit. In this case, in the Standby mode, the controller may maintain the vibration sensor unit in the active state and may maintain the touch sensor unit in the inactive mode. Additionally, after the quick control menu is displayed by the second control input, the controller may shift the vibration sensor unit to the inactive state and may shift the touch sensor unit to the active state.

Moreover, according to another exemplary embodiment, as described in FIG. 4, the controller may detect the first part and the starting point of the second part of the second control input by using the vibration sensor unit, and the controller may detect the ending point of the second part by using the touch sensor unit. For example, in case the control detects the first part and the starting point of the second part of the second control input by using the vibration sensor unit, the controller may detect the ending point of the second control input and the third control input, which selects a shortcut icon included in the quick control menu, by using the touch input sensor. In this case, in the Standby mode, the controller may maintain the vibration sensor unit in the active state and may maintain the touch sensor unit in the inactive mode. Additionally, after the starting point of the second part of the second control input is detected, the controller may shift the vibration sensor unit to the inactive state and may shift the touch sensor unit to the active state.

Additionally, according to another exemplary embodiment, as described in FIG. 5, the controller may detect the first part of the second control input by using the vibration sensor unit, and the controller may detect the second part by using the touch sensor unit. For example, in case the controller detects the first part of the second control input, which displays the quick control menu, by using the vibration sensor unit, the controller may detect the second part and the third control input, which selects a shortcut icon included in the quick control menu, by using the touch sensor unit. In this case, in the Standby mode, the controller may maintain the vibration sensor unit in the active state and may maintain the touch sensor unit in the inactive mode. Additionally, after the first part of the second control input is detected, the controller may shift the vibration sensor unit to the inactive state and may shift the touch sensor unit to the active state.

Furthermore, according to another exemplary embodiment, as described in FIG. 6, the controller may detect the first part and the second part of the control input by using the touch sensor unit. In this case, after the Standby mode and the quick control menu are displayed, the controller may maintain the vibration sensor unit in an inactive state.

As described in FIG. 7, the controller may detect the movement of the digital device in order to move or relocate the position of the displayed quick control menu. Herein, the controller may use the acceleration sensor unit. The controller may relocate the position of the quick control menu to an opposite direction of the detected moving direction of the digital device.

As described in FIG. 8 and FIG. 9, the controller may realign the quick control menu based upon the position of the control input and display the realigned quick control menu, or the controller may decide whether or not to display the quick control menu. Since the digital device has a limited display area, the controller may provide the quick control menu to the user by changing the alignment of the quick control menu or by partially displaying the quick control menu.

FIG. 10 illustrates a block view of an exemplary embodiment, wherein the blocks that are divided and marked respectively correspond to logically identified elements of the digital device. Therefore, the elements of the above-described digital device may be equipped as a single chip or as multiple chips depending upon the design of the digital device.

FIG. 11 illustrates an operation flow chart of the digital device according to an exemplary embodiment of the present specification. The digital device may be maintained in a Standby mode until a point before a control input is detected (S10). As described in FIG. 3 to FIG. 6, in the Standby mode, the digital device may maintain the touch sensor unit or the vibration sensor unit in an active state. The digital device may detect a control input by using the activated sensor unit, even when the digital device is being operated in the Standby mode. In case the touch sensor unit is activated while the digital device is being operated in the Standby mode, the digital device may maintain the vibration sensor unit in an inactive state. Moreover, in case the vibration sensor unit is activated while the digital device is being operated in the Standby mode, the digital device may maintain the touch sensor unit in an inactive state. Accordingly, in the Standby mode, by maintaining any one of the touch sensor unit and the vibration sensor unit in the inactive mode, a power saving effect may be gained.

In the Standby mode, the digital device may detect a first control input or a second control input (S20). As described in FIG. 1, the first control input and the second control input may each include two parts. The first control input and the second control input may be partially identical to one another. For example, in case the first control input includes a first part and a second part, and in case the second control input includes a third part and a fourth part, the first part and the third part may be identical. Accordingly, the digital device may differentiate the first control input from the second control input by comparing the second part of the first control input and the fourth part of the second control input. As described in FIG. 3 to FIG. 6, the digital device may detect the first control input and the second control input by using at least one of the touch sensor unit and the vibration sensor unit. Additionally, the digital device may detect the two parts included in each control input by using different sensor units. For example, the digital device may detect the third part of the second control input by using the vibration sensor unit, and the digital device may detect the fourth part of the second control input by using the touch sensor unit. The sensor unit detecting the parts of each control input may be varied in accordance with the exemplary embodiments. This has been described above in detail with reference to FIG. 3 to FIG. 6.

When the first control input is detected, the digital device may activate the display unit (S30). When the first control input is detected, the digital device may activate the display unit and may display a lock screen or a home screen depending upon set-up values.

When the second control input is detected, the digital device may activate the display unit and may display a quick control menu (S40). The digital device may display the quick control menu with respect to a location where the second part of the second control input is detected. As described in FIG. 8, the digital device may realign the quick control menu and display the realigned quick control menu, or the digital device may display only a portion of the quick control menu. Additionally, as described in FIG. 9, the digital device may decide whether or not to display the quick control menu in accordance with the location where the second control input is detected.

The digital device may detect a third control input, which controls the quick control menu (S50). As described in FIG. 2, the third control input may correspond to a slide input, which slides over the display unit. The third control input may be inputted in succession to the second control input and may also be inputted while a contact between the second control input and the display unit is maintained. The digital device may detect the third control input, so as to allow the user to decide which one of the shortcut icons of the quick control menu is to be selected.

Moreover, as described in FIG. 7, the third control input may correspond to an input relocating or moving the digital device. The digital device may detect a moving direction and distance of the digital device, which is moved by the third control input. The digital device may move the display quick control menu to a direction opposite to the moving direction of the digital device, which is moved by the third control input. Accordingly, the digital device may locate an icon, which the user intends to select, to a position where a contact between the third control input and the display unit is detected.

The digital device may be shifted to the Active mode with respect to the third control input and may execute an application (S60). The digital device may display an execution screen of an application respective to the icon, which is selected from the quick control menu by the third control input.

As described above, the digital device of this specification may execute an application, which is wanted by the user, by providing the user with a quick control menu while the digital device is being operated in the Standby mode. Accordingly, the user may be quickly introduced to the execution screen of a wanted application while the digital device is being operated in the Standby mode.

Mode for the Invention

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to electronic devices.

The invention claimed is:

1. A digital device executing an application, the digital device comprising:
   a display unit;
   a touch sensor unit configured to detect a contact between a control input and the display unit;
   a vibration sensor unit configured to sense vibration generated by the control input; and
   a controller configured to:
      control the display unit and the touch sensor unit;
      if a first control input is detected in a Standby mode, activate the display unit;
      if a second control input is detected in the Standby mode, activate the display unit and cause the display unit to display a quick control menu at a position where the second control input is detected; and
      cause the display unit to display an execution screen of the application in response to a third control input selecting the quick control menu,
   wherein the display unit is inactivated in the Standby mode,
   wherein each the first control input and the second control input includes two parts, and
   wherein a first part included in the first control input is same as a first part included in the second control input,
   wherein a second part included in the first control input is different from a second part included in the second control part,
   wherein the position where the second control input is detected is an end point of the second control input where the second part of the second control input is released,
   wherein each of the first part of the first control input and the first part of the second control input comprises a short touch,
   wherein the second part of the first control input comprises a second short touch that is sequentially detected following the short touch of the first part of the first control input,
   wherein the second part of the second control input comprises a long touch that is sequentially detected following the short touch of the first part of the second control input, and
   wherein the controller is further configured to:
      detect the second part of the second control input through the vibration sensor unit; and
      deactivate the vibration sensor unit when the second part of the second control input is detected.

2. The digital device of claim 1,
wherein the controller is further configured to:
  detect the first part and the second part of the second control input; and
  cause the display unit to display the quick control menu based upon a position where the second part is detected.

3. The digital device of claim 2, wherein the controller is further configured to detect the first part of the second control input through the vibration sensor unit.

4. The digital device of claim 1, wherein the touch sensor unit is deactivated in the Standby mode, and
  wherein the controller activates the touch sensor unit when the second part of the second control input is detected.

5. The digital device of claim 2, wherein the second part of the second control input is detected through the vibration sensor unit and the touch sensor unit,
  wherein the vibration sensor unit is further configured to sense vibration of the digital device generated by the second part of the second control input, and
  wherein the touch sensor unit is further configured to sense a contact between the second part of the second control input and the display unit, after the vibration sensor unit senses the vibration generated by the second part of the second control input.

6. The digital device of claim 5, wherein the touch sensor unit is deactivated in the Standby mode, and
  wherein the controller activates the touch sensor unit after the vibration sensor unit senses the vibration generated by the second part of the second control input.

7. The digital device of claim 5, wherein the controller is further configured to detect the second part of the second control input when a contact between the second part of the second control input and the display unit is sensed for a first time period or longer.

8. The digital device of claim 2, wherein the controller is further configured to:
  detect the second part of the second control input through the touch sensor unit; and
  deactivate the vibration sensor unit when the first part of the second control input is detected.

9. The digital device of claim 8, wherein the touch sensor unit is deactivated in the Standby mode, and
  wherein the controller activates the touch sensor unit when the first part of the second control input is detected.

10. The digital device of claim 8, wherein the controller is further configured to detect the second part of the second control input when a contact between the second part of the second control input and the display unit is sensed for a first time period or longer.

11. The digital device of claim 1, wherein the quick control menu includes a plurality of shortcut icons, each icon corresponding to a respective one of a plurality of applications.

12. The digital device of claim 11, wherein the controller is further configured to:
  realign the plurality of shortcut icons based upon a position where the second part of the second control input is detected; and
  cause the display unit to display the realigned plurality of shortcut icons.

13. The digital device of claim 2, wherein the controller is further configured to:
  divide the display unit into a first area and a second area; and
  cause the display unit to display the quick control menu when a position where the second part of the second control input is detected corresponds to the first area,
  wherein the quick control menu is not displayed when a position where the second part of the second control input is detected corresponds to the second area.

14. The digital device of claim 13, wherein the first area corresponds to a central area of the display unit located at a distance exceeding a first distance from an edge of the display unit.

15. The digital device of claim 13, wherein the second area corresponds to a borderline area of the display unit located within a first distance from an edge of the display unit.

16. The digital device of claim 1, wherein the controller is further configured to move a position of the displayed quick control menu along an opposite direction of a first direction, when the digital device is moved along the first direction by the third control input.

17. The digital device of claim 16, wherein the quick control menu is configured to include a plurality of shortcut icons, each icon corresponding to a respective one of a plurality of applications, and
  wherein the controller is further configured to:
  select a shortcut icon located in an opposite direction of the first direction from a position where the second control input is detected; and
  cause the display unit to display an execution screen of the application respective to the selected shortcut icon.

18. A method for controlling a digital device executing an application, the method comprising:
  if a first input is detected in a Standby mode, activating a display unit;
  if a second control input is detected in the Standby mode, activating the display unit and displaying a quick control menu at a position where the second control input is detected; and
  displaying an execution screen of the application in response to a third control input selecting the quick control menu,
  wherein the display unit is inactivated in the Standby mode,
  wherein each of the first control input and the second control input includes two parts,
  wherein a first part included in the first control input is same as a first part included in the second control input,
  wherein a second part included in the first control input is different from a second part included in the second control part,
  wherein the position where the second control input is detected is an end point of the second control input where the second part of the second control input is released,
  wherein each of the first part of the first control input and the first part of the second control input comprises a short touch,
  wherein the second part of the first control input comprises a second short touch that is sequentially detected following the short touch of the first part of the first control input,
  wherein the second part of the second control input comprises a long touch that is sequentially detected following the short touch of the first part of the second control input, and
  wherein the method further comprises:
  detecting the second part of the second control input through the vibration sensor unit; and
  deactivating the vibration sensor unit when the second part of the second control input is detected.

* * * * *